Jan. 29, 1957     C. W. LINCOLN ET AL     2,779,427
FLUID POWER STEERING APPARATUS
Filed April 8, 1954     2 Sheets-Sheet 1
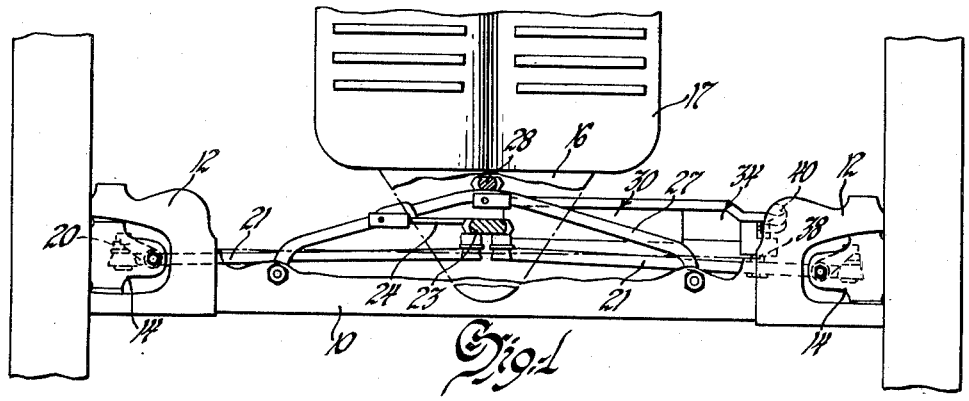
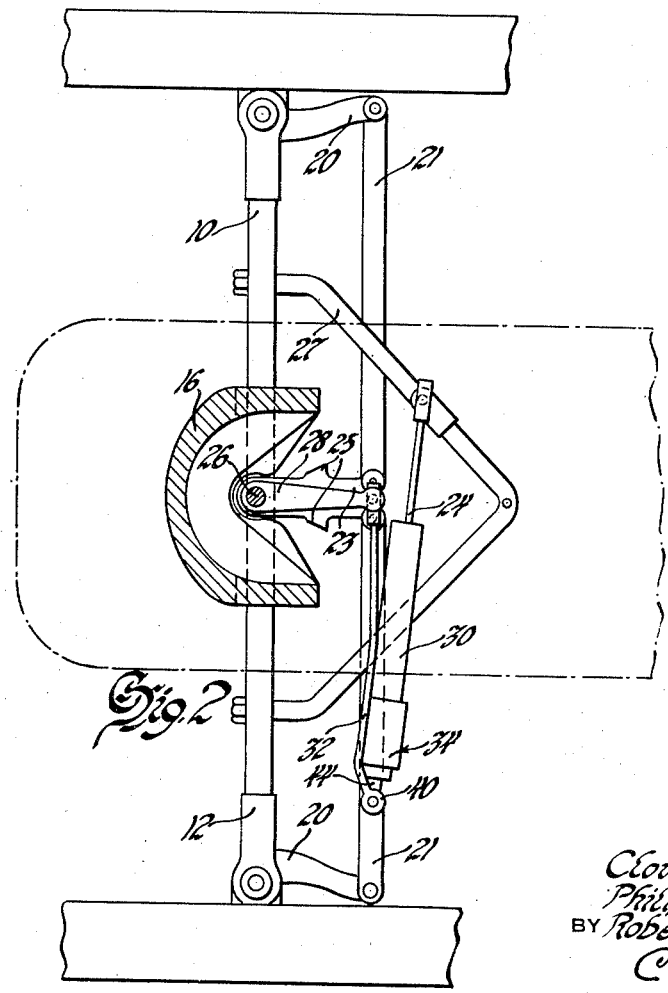
INVENTORS
Clovis W. Lincoln,
Philip B. Zeigler &
BY Robert M. Gold
C. H. Ritbe
ATTORNEY Jan. 29, 1957   C. W. LINCOLN ET AL   2,779,427
FLUID POWER STEERING APPARATUS
Filed April 8, 1954   2 Sheets-Sheet 2
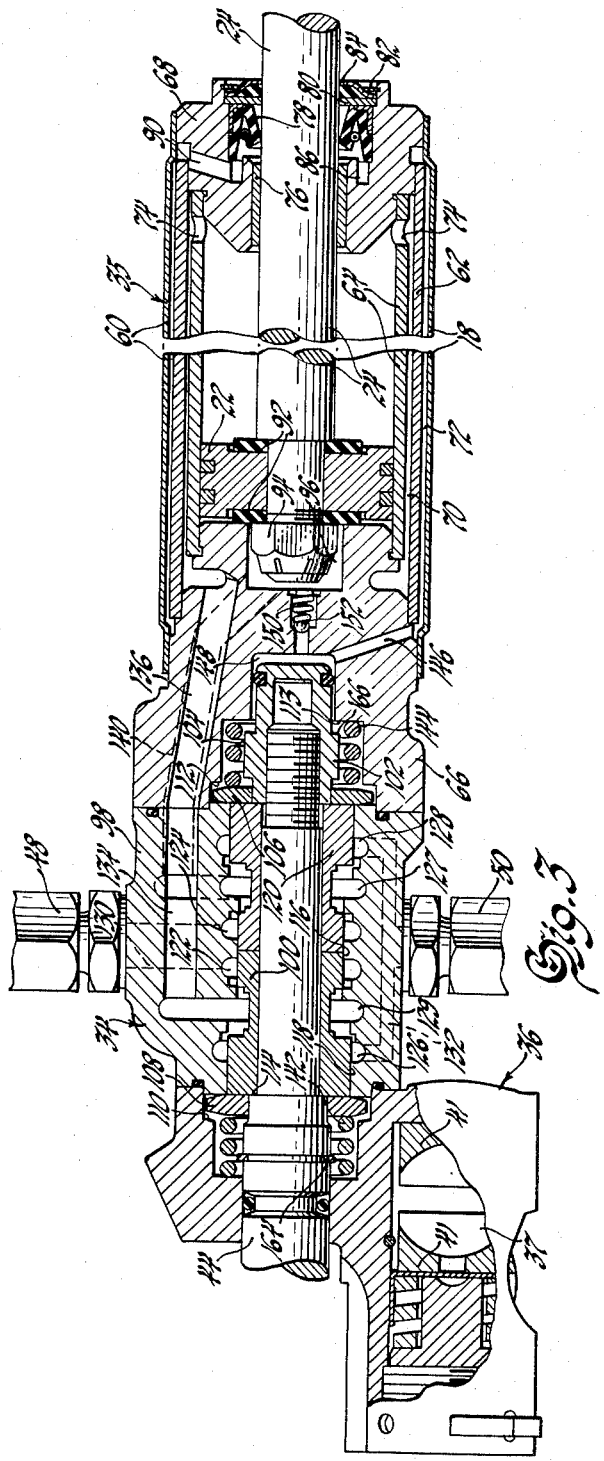
INVENTORS
Clovis W. Lincoln,
Philip B. Zeigler &
BY Robert M. Gold
C. H. Dible
ATTORNEY

# United States Patent Office 2,779,427
Patented Jan. 29, 1957

2,779,427

FLUID POWER STEERING APPARATUS

Clovis W. Lincoln and Philip E. Zeigler, Saginaw, Mich., and Robert M. Gold, Minneapolis, Minn., assignors to General Motors Corporation, Detroit, Mich., a corporation of Delaware Application April 8, 1954, Serial No. 421,884

4 Claims. (Cl. 180—79.2)

This invention relates to the fluid power steering of automotive vehicles utilizing a fixed front axle and a parallelogram steering linkage. In its most particular aspect, the invention is concerned with the fluid power steering of tractors and similar vehicles comprising such an axle and linkage system.

The principal object of the invention is to provide apparatus for the purpose indicated which is cheaply manufactured, readily installed, and positive in operation.

Other objects and features will be apparent from the following description which will proceed with reference to the accompanying drawings illustrating a preferred embodiment and in which:

Figure 1 is a fragmentary front elevation of a tractor equipped according to the invention;

Figure 2 is a plan of the particular system; and

Figure 3 is a broken longitudinal section through an assemblage appearing in the other figures.

Referring first to Figures 1 and 2, the numeral 10 denotes a fixed front axle carrying at either end a yoke 12 journalling the king pins about which the steering knuckles 14 turn. A bolster 16 on the axle 10 provides a mounting for the engine of the vehicle, not shown, positioned rearwardly of the radiator 17 (Figure 1).

Steering knuckle arms 20, extending rearwardly of the axle 10, are each linked to the outer end of a tie rod 21, the tie rods being interconnected via an idler arm 23 supported for relative rotation on a rockshaft 26, representing the output of a conventional gear box not shown. Movement of the idler arm is limited by stops 25 adapted to engage the bolster 16.

In addition to idler arm 23, rockshaft 26 carries a pitman arm 28, fixed to the shaft and interconnected with the valve component of a combined valve and fluid motor assembly 30 through a rod 32. Assembly 30 is shown in the necessary detail by Figure 3 wherein the valve component is generally indicated by the numeral 34, the fluid motor by the numeral 35.

Valve 34, at its left hand end, has secured thereto an adapter 36 providing a socket 37, delineated by seats 41, for the reception of a ball stud 38 (Figure 1) suitably secured to the adjacent tie rod 21. Above the adapter 36 is a ball and socket type connection 40, seen in Figure 2, through which rod 32 is linked to the stem 44 of the valve.

Valve 34 is provided with a pair of hose fittings 48, 50, the corresponding hoses, not shown, extending respectively to a pump powered as from the crankshaft of the engine of the tractor and an oil reservoir from which the pump draws. Illustration of the pump and reservoir is not believed necessary, these components being conventional and well understood in the art. As indicated, hydraulic operation of the subject gear is preferred, but the same may be adapted for air or vacuum operation, for example.

Fluid motor 35 includes a piston 22 having a shaft 24 anchored to a bracket piece 27 fixed to the axle 10. Cylinder 18, confining the piston 22, is shown as formed of three concentric tubular members 60, 62 and 64, each of which may be secured as by welding to the valve end housing member 66 and a cap piece 68 at the end of the cylinder opposite such housing member. The tubular members are suitably spaced apart so as to provide annular conduits 70 and 72, the purpose of which will later appear. Inner tubular member 64 is apertured at 74, thus opening the inner annular conduit 70 to the right hand chamber of the cylinder.

Cylinder cap piece 68 provides a bearing for the piston shaft 24, the cap proper being spaced from the shaft by a bushing 76. Beyond this bushing is a low-pressure seal 78 of an easily recognizable type held in place by an annular thrust washer 80 outside of which is a suitable wiping ring retained by backup washer 84 and locking piece 82. Mediate the low-pressure seal and the outer inner face of the cap piece 68 is an annular space 86 which forms what may be referred to as a fluid collection chamber. A passageway 90 connects the space 86 and the outer annular conduit 72.

Piston 22, as shown, carries a pair of sealing rings 92 and is connected to the piston shaft 24 by bolting, the bolt 94, in the position of the piston as shown nesting in a recess 96 in the valve housing member 66.

The valve 34, in addition to the housing member 66, comprises a central housing member 98 confining a spool element 100. This element is centrally bored to receive the previously mentioned stem 44, that portion of the stem within the spool being of reduced diameter.

A nut element 102 having an annular rib 104 is threaded on the end of the stem 44 within the housing member 66, such element being surrounded by a thrust washer 106 and bearing tightly against the spool 100. A second thrust washer 108 surrounds the stem 44 at the other end of the spool. These washers 106 and 108 are confined respectfully in recesses formed in the housing member 66 and the adapter 36, the adapter serving as a part of the valve housing. It is to be noted that longitudinal movement of the spool is limited by the shoulders 110 and 112 provided by the recessing; also that the annular shoulder 114 resulting from the reduction in the diameter of the stem 44 within the spool is held tightly against the left-hand end of the spool by the nut 102, any movement of the stem thus necessarily inducing like movement of the spool.

The spool element comprises a central land 116 and a pair of end lands 118 and 120, the end lands being of larger diameter than the central land for a purpose which will later appear.

In addition to being bored to accommodate the spool 100, valve housing member 98 is radially bored and counter-bored to provide circular central passageways 122 and 124, circular end passageways 126 and 128, and circular intermediate passageways 127 and 129. Passageways 122 and 124 represent inlet passageways, the inlet port 130 opening to both. Passageways 126 and 128 both communicate with a longitudinal passageway 132 connecting with the hose corresponding to fixture 50 through which exhaust fluid from the cylinder 18 is returned to the source of fluid pressure. A second longitudinal passageway 134 extends from a point intermediate the central land 116 and the end land 118 to a point of juncture with a passageway 136 in the valve housing member 66. The passageway 136 connects with the annular conduit 70, which, as previously noted, opens to the cylinder via the apertures 74.

A third longitudinal passageway 140 extends from a point intermediate the central land 116 and the end land 120 to the recess 96, which is part of the chamber of the cylinder.

Surrounding the stem 44 to the left of the valve spool 100 is a spring 142. This spring is confined within a recess formed within the adapter 36 and bears against the thrust washer 108 and the annular wall representing the maximum depth of the recess. Similarly, to the right of the spool piece 100 there is confined within a recess formed in the valve housing member 66 and surrounding the nut 102 a second spring 144 which bears against the thrust washer 106 and the annular wall 113.

Springs 142 and 144 serve to normally maintain the valve spool in the neutral or centered condition in which the spool is shown. As previously stated, the maximum movement of the spool is determined by the spacing between the thrust washers 108, 106 and the shoulders 110 and 112 respectively. With the valve spool centered, fluid entering the valve via the port 130 is divided laterally into two streams corresponding to the opposite sides or faces of the piston in the power cylinder 18. It is important to note that Figure 3 does not represent an operational view, the normal position of the piston being central of the cylinder.

The pump, not shown, representing the source of the fluid medium is in constant operation at all times, the fluid merely being cycled through the unitary valve and power cylinder when there is no power steering demand. The fluid diverted to the left of the central land 116 has ingress to the right hand end of the cylinder via passageways 134, 136, annular conduit 70 and aperture 74, while the fluid diverted to the right of the central land has ingress to the left-hand end of the cylinder via passageways 140 and recess 96. The recycle of the fluid to the pump or to the reservoir supplying the pump follows passageway 132 which is common to the circular passageways 126 and 128 and which connects with the port corresponding to the fixture 50.

Considering that the system is necessarily operated under a substantial pressure, reaching a maximum somewhat in excess of 700 pounds per square inch at high steering resistances, it should be apparent that a low pressure seal such as shown at 78 would not normally prevent leakage. This seal, however, is adequate to withstand the pressure of the fluid which accumulates from leakage past the bushing 76 between the seal and the spring loaded check valve 152. This valve is disposed in a passageway 150 in the valve housing member 66 and connects with the chamber 86 via a passageway 146, extending radially from the space 148, annular conduit 72, and passageway 90. The ball check valve is necessary in order to prevent reversal of fluid flow in the identified passageways; i. e. entry of fluid into these passageways from the left-hand end of the cylinder. When sufficient pressure develops between the seal and valve the latter is unseated and the bleed fluid enters the cylinder and is thus re-used in the system without loss.

Reverting now to the springs 142, 144 at the ends of the valve spool, attention should be called to the fact that the centering action thereof is supplemented by the forming of the end lands 118, 120 of the spool 100 to a larger diameter than the central land 116. This will be readily understood when the lateral diversion of the inlet fluid as previously described is taken into account. The fluid centering feature forms no part of the present invention, being described in detail in application Serial No. 273,067, filed February 23, 1952, in the name of Clovis W. Lincoln, now abandoned.

The total centering force provided by the springs, aided as just indicated by the pressure of the inlet fluid against the inner annular walls of the end lands is arbitrary and is determined by the preloading of the springs. Ordinarily, this centering force represents from two to four pounds of manual effort at the rim of the steering wheel. In other words, there is no displacement of the valve spool and hence no power steering when the resistance to steering is less than the total centering force. With this condition prevailing, the vehicle is simply steered manually in the conventional way through the rod 32 and the adapter 36, the manual steering necessarily proceeding with reciprocation of the cylinder 18 on the piston shaft 24.

To describe the operation of the system, let it be assumed that the operator of the vehicle wishes to negotiate a right turn and that the steering resistance is greater than the total centering force. In this case, on the clockwise rotation of the rockshaft 26 (Figure 2), the valve spool will be displaced to the left and the flow of the fluid entering the valve body through the port 130 will be partially or completely confined to the left hand end of the cylinder 18 served by the passageway 140, the cylinder thus being caused to power the tie rods 21 to the left. Such movement of the tie rods, of course, swings the dirigible wheels to the right.

When the rockshaft 26 is rotated to the left in order to negotiate a left turn, the action obviously will be the opposite of that just described, the cylinder in this instance being caused to move rightward by the partial or complete confinement of the flow of the pressure fluid to the end of the cylinder from which the piston shaft 24 extends.

Should the steering resistance be abnormally high (as when one or both of the dirigible wheels is lodged in a deep rut, for example), damage to any of the component parts of the system may be prevented by a suitably located relief valve. This is a conventional expedient well known in the art and the valve for that reason need not be illustrated in the drawings.

In the event manual steering of the vehicle should become necessary, there will, of course, be a very slight lag in either direction owing to the lost motion represented by the spacing between the thrust washers 106 and 108 and the shoulders 112 and 110, respectively. Overstops 164 and 166, the latter being provided by the previously mentioned rib 104 of the nut 102, prevent excessive distortion of the washers.

It will be understood that the valve housing constitutes the followup member of the booster unit, the same moving in a direction corresponding to the direction of movement of the valve spool and tending at all times to catch up with the spool thereby to bring the two parts in a centered relation so as to de-energize the fluid motor.

Having thus described and illustrated our invention, what we claim is:

1. In association with a steering system for vehicles having a fixed front axle mounting a dirigible wheel at each end thereof, said system including a rockshaft substantially centered between said wheels, a pitman arm fixed on said shaft, a parallelogram linkage including a pair of tie rods and a pair of steering knuckle arms, apparatus comprising an idler arm rotatable on said rockshaft and inter-connecting the inner ends of said tie rods, said idler arm carrying stop means adapted to engage a fixed portion of the vehicle to limit the movement of said linkage, a source of fluid pressure, fluid motor means supported from said axle and by one of said tie rods for power operation of the latter, and valve means for controlling the fluid flow to said motor, said valve means being actuated through said pitman arm.

2. In association with a steering system for vehicles having a fixed front axle mounting a dirigible wheel at each end thereof, said system including a rockshaft substantially centered between said wheels, a pitman arm fixed on said shaft, a parallelogram linkage including a pair of tie rods and a pair of steering knuckle arms, apparatus comprising an idler arm rotatable on said rockshaft and inter-connecting the inner ends of said tie rods, said idler arm carrying stop means adapted to engage a fixed portion of the vehicle to limit movement of said linkage, a source of fluid pressure, fluid motor means supported through a bracket member fixed to said axle and by one of said tie rods for power operation of the latter, and valve means for controlling the fluid flow to said motor, said valve means being actuated by said pitman arm through rod means therebetween.

3. A steering system according to claim 2 further characterized in that the said motor and the said valve means are combined in a single assembly.

4. In association with a steering system for vehicles having a fixed front axle mounting a dirigible wheel at each end thereof, said system including a rockshaft substantially centered between said wheels, a pitman arm fixed on said shaft, a parallelogram linkage including a pair of tie rods and a pair of steering knuckle arms, apparatus comprising an idler arm rotatable on said rockshaft and inter-connecting the inner ends of said tie rods, said idler arm carrying stop means adapted to engage a fixed portion of the vehicle to limit movement of said linkage, a source of fluid pressure, an assemblage combining a fluid motor and valve means therefor, said motor including a cylinder and a piston therewithin having a shaft fixed to a bracket fast to said axle, said cylinder being connected to one of said tie rods for power operation of the latter, and means whereby said valve means may be actuated through said pitman arm.

References Cited in the file of this patent

UNITED STATES PATENTS

| | | |
|---|---|---|
| 2,426,938 | Langley | Sept. 2, 1947 |
| 2,427,340 | Allison | Sept. 16, 1947 |
| 2,487,618 | Twyman | Nov. 8, 1949 |
| 2,507,106 | Knapp | May 9, 1950 |
| 2,676,663 | Smith | Apr. 27, 1954 |